(12) United States Patent
Kwon et al.

(10) Patent No.: US 7,083,773 B2
(45) Date of Patent: Aug. 1, 2006

(54) METHOD FOR PRODUCING NITROGEN TRIFLUORIDE USING JET-LOOP REACTORS

(75) Inventors: Young-soo Kwon, Seoul (KR); Hong-gon Kim, Seoul (KR); Sang-deuk Lee, Seoul (KR); Jae-woo Lee, Seoul (KR); Jong-yev Hong, Seoul (KR); Hyung-sik Lim, Seoul (KR); Byoung-sung Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 144 days.

(21) Appl. No.: 10/620,902

(22) Filed: Jul. 16, 2003

(65) Prior Publication Data

US 2004/0013595 A1    Jan. 22, 2004

(30) Foreign Application Priority Data

Jul. 19, 2002  (KR) .................... 10-2002-0042542

(51) Int. Cl.
    *C01B 21/06* (2006.01)
(52) U.S. Cl. .................. 423/406; 423/470; 423/483
(58) Field of Classification Search ............... 423/406, 423/483, 470
    See application file for complete search history.

(56) References Cited

U.S. PATENT DOCUMENTS

| 3,235,474 A | 2/1966 | Tompkins, Jr. et al. ....... 204/63 |
| 4,091,081 A | 5/1978 | Woytek et al. .............. 423/406 |
| 4,543,242 A * | 9/1985 | Aramaki et al. ............ 423/406 |
| 5,628,894 A | 5/1997 | Tarancon .................... 205/359 |
| 5,637,285 A | 6/1997 | Coronell et al. ............ 423/406 |
| 6,010,605 A | 1/2000 | Tarancon .................... 204/246 |
| 6,342,199 B1 * | 1/2002 | Ellis ......................... 423/659 |
| 6,790,428 B1 * | 9/2004 | Tsirukis et al. ............. 423/483 |
| 2004/0120877 A1 * | 6/2004 | Satchell ..................... 423/406 |
| 2004/0191156 A1 * | 9/2004 | Satchell et al. ............. 423/406 |

FOREIGN PATENT DOCUMENTS

| JP | 09-221307 | 8/1997 |
| JP | 2002-201011 | 7/2002 |

OTHER PUBLICATIONS

"Nitrogen trifluoride by direct synthesis", Chemical Engineering, Dec. 5, 1977, pp. 116-117.

* cited by examiner

*Primary Examiner*—Wayne A. Langel
(74) *Attorney, Agent, or Firm*—Ohlandt, Greeley, Ruggiero & Perle LLP

(57) ABSTRACT

Nitrogen trifluoride is produced with a high yield by the method comprising forming a fast stream of micro droplets of a fused ammonium fluoride salt by rapidly ejecting the fused ammonium fluoride salt into a reactor through a nozzle while circulating the fused ammonium fluoride salt in the reactor from a lower portion to an upper portion; and contacting micro droplets of the fused ammonium fluoride salt with fluorine gas sucked in the reactor through a suction pipe for fluorine by a negative pressure formed around the nozzle due to an ejection of the fused ammonium fluoride salt, whereby excessive generation and regional accumulation of the heat of reaction are prevented, reducing the reaction temperature by 10~30° C. compared with those of the existing methods, and a side reaction occurs only to a slight extent according to the lowered reaction temperature.

10 Claims, 4 Drawing Sheets

METHOD FOR PRODUCING NITROGEN TRIFLUORIDE USING JET-LOOP REACTORS

CROSS REFERENCE TO RELATED APPLICATIONS

The present application is claiming priority of Korean Patent Application No. 10-2002-0042542 filed on Jul. 19, 2002.

BACKGROUND OF THE INVENTION

1. Field of the Invention

The present invention relates to a method for producing nitrogen trifluoride, and more particularly to a method for producing nitrogen trifluoride using jet-loop reactors, wherein fused ammonium fluoride salt is rapidly ejected through a nozzle so that the fluorine gas is sucked and well mixed in the fused ammonium fluoride salt ejected as a fast stream, thus producing nitrogen trifluoride in a high yield.

2. Description of the Prior Art

Nitrogen trifluoride (hereinafter called $NF_3$) is a stable gas, that has little reactivity at room temperature. It is an expensive gas, which has been gradually and widespreadingly used in etching of silicon or silicon oxide layers and in dry cleaning of chemical vapor deposition (CVD) chambers in the manufacturing processes of the semiconductor or the liquid crystal display (LCD). It has been also used as a source of chemical laser with stable high-energy, a rocket fuel, a gas for surface-modification of organic/inorganic materials such as polymers, a source of fluorine in producing fluoroolefins, and a dehydration gas in the optical fiber manufacturing process.

It has been known that $NF_3$ can be produced by various methods: first, a reaction through the contact of fluorine gas with a fused ammonium fluoride salt; second, collection at an anode through an electrolysis of a fused ammonium fluoride salt, a mixed fused salt of ammonium fluoride and potassium fluoride, or a mixed fused salt of ammonium fluoride and urea; third, a reaction of inorganic ammonium salt with metallic fluoride such as $NiF_2$; and fourth, plasma reaction between fluorine and nitrogen at high temperature.

U.S. Pat. No. 4,091,081 (1978) discloses a method for producing $NF_3$ by directly contacting fluorine gas with a fused ammonium fluoride salt, wherein the fused ammonium fluoride salt is intensely stirred by a flat-blade turbine and fluorine gas is supplied thereto through a sparger with small discharge holes, thereby the gas and the fused salt contact with each other. Though the document discloses that the yield of $NF_3$ reaches 63% which is larger than 30~50% that the former conventional documents have announced, it has a drawback in that the yield is gradually reduced with the passage of time.

U.S. Pat. No. 5,637,285 (1997) discloses a method for producing $NF_3$ by supplying fluorine gas while intensely stirring a fused ammonium fluoride salt or a metallic fluoride-containing fused ammonium fluoride salt with a flat-blade turbine, thereby maintaining the selectivity of $NF_3$ at 60% or higher and the yield at 65% or higher. However, this method requires a strong stirring force per unit volume of at least 4.5 $kW/m^3$ for converting $F_2$ up to 63%, so that the $NF_3$ yield is not satisfied even while introducing an intense stirring force many times larger than that used in ordinary chemical reactors. It is understood that this is because of the low contact efficiency of the fused ammonium fluoride salt and $F_2$.

U.S. Pat. No. 4,543,242 (1985) discloses that, in a laboratory study, $F_2$ gas is contacted with a granular solid metallic ammonium fluoride complex such as $(NH_4)_3AlF_6$ or $(NH_4)_2NaAlF_6$, etc. at a temperature of 80° C. or higher, thus producing a $NF_3$ yield of 65~78%.

Japanese Patent No. 44,212 (2000) improves the above-mentioned method, thus increasing the $NF_3$ yield up to 87%. However, the solid reactants should be periodically replaced with new ones because they are difficult to be regenerated. In addition, there is no proper method for safely discarding the solid waste matters. Therefore, this method is not yet adopted industrially.

U.S. Pat. No. 3,304,248 (1967) discloses a method for producing $NF_3$ by reacting plasmas of nitrogen and fluorine at a temperature of 8000° C. or higher and then rapidly cooling the gases.

U.S. Pat. No. 3,235,474 (1966) and U.S. Pat. No. 3,356,454 (1967) disclose a method for collecting $NF_3$ at an anode made of amorphous carbon or Ni through the electrolysis of a fused ammonium fluoride salt. This method, however, has a drawback that since an explosion occurs if $NF_3$ generated from an anode is mixed with $H_2$ generated from a cathode at a certain ratio, the concentrations of $NF_3$ and $H_2$ should be controlled in a certain range not to cause an explosion by adding a large amount of an inert gas such as He or nitrogen thereto.

In order to prevent an explosion during an electrolysis, U.S. Pat. No. 4,804,447 (1989) discloses a method for producing a $H_2$-excluded $NF_3$ gas by electrolyzing a fused mixed solution of ammonium fluoride salt and $N_2H_4.2HF$, thereby obtaining about 55% of $NF_3$ yield.

In order to prevent an explosion during the electrolysis, other U.S. Pat. No. 5,084,156 (1992) and U.S. Pat. No. 5,085,752 (1992) disclose an electrolyzer using a skirt made of or coated with fluorine-based resin, which still has drawbacks that the Ni anode is electrically eroded during the electrolysis to gradually produce metal sludge.

It has been known that, among the above methods for producing $NF_3$, a direct fluorination, in which a fused ammonium fluoride salt is reacted with fluorine to produce $NF_3$, and an electrochemical fluorination, in which a fused ammonium fluoride salt is electrolyzed to produce $NF_3$ on the anode side, are commercially useful. The direct fluorination the present invention pertains to will be hereinafter described in detail.

As described above, the direct fluorination is a method, wherein fluorine is introduced into a fused ammonium fluoride salt so as to directly contact the ammonium fluoride salt. When introduced, fluorine reacts with the fused ammonium fluoride salt, thus producing $NF_3$ and hydrofluoric acid anhydride (hereinafter referred to HF) as shown in the following reaction equation 1.

{reaction equation 1}

However, since the fused ammonium fluoride salt is reacted in the state in which HF has been bound thereto and the HF produced during the reaction becomes additionally bound to the ammonium fluoride salt (the binding method is not definitely defined) without being vented as HF vapor, the overall reaction equation of the direct fluorination can be expressed as the following reaction equation 2.

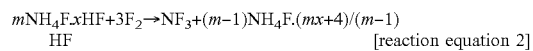
[reaction equation 2]

Herein, x is a number of 0~5, m is an integer larger than 1. When m is 1 and x is 0, the reaction occurs as the reaction equation 1, so that, in general, 4 moles of HF per one mole of $NF_3$ are generated and are bound to $NH_4F$, whereby the number of HF bound to one mole of $NH_4F$ is expressed as (mx+4)/(m−1) which exceeds x.

Accordingly, along the procedure of the reaction, the number of HF to be bound to the ammonium fluoride salt is gradually increased, so that, in order to constantly maintain the number of HF bound to the ammonium fluoride salt, ammonia needs to be introduced continuously or intermittently so as to react with HF. Such a reproduction reaction of the ammonium fluoride salt as above is expressed as the following reaction equation 3.

$$nNH_4F.yHF+NH_3 \rightarrow (n+1)NH_4F.(ny-1)/(n+1)HF$$ [reaction equation 3]

Herein, y is a number higher than 0 and lower than 5, and n is a large integer of 1 or more. When the reaction is proceeded, the number of moles of $NH_4F$ is increased and thus the number of HF bound to one mole of $NH_4F$, which is expressed as (ny−1)/(n+1), is lower than y.

Meanwhile, both the production reaction for $NF_3$ through reacting fluorine in gaseous state with a fused ammonium fluoride salt (reaction equation 2) and the reproduction reaction for the ammonium fluoride salt through reacting ammonia with the fused ammonium fluoride salt bound with extra HF (reaction equation 3) have drawbacks that their reaction rates are so rapid and their heats of reaction are so high that it is difficult to control their reaction temperatures due to the rapid rise of temperature during the reactions.

Thus, in the direct fluorination, the problems to be solved for commercialization are concerned in the ways for supplying gaseous fluorine and ammonia to a fused ammonium fluoride salt while being smoothly and homogeneously distributed therein and for maintaining a constant amount of the fused salt in a reactor through removal of the extra amount of the ammonium fluoride salt produced.

For further reference, a net reaction equation representing both the production reaction for $NF_3$ (reaction equation 2) and the reproduction reaction for a fused ammonium fluoride salt (reaction equation 3) can be expressed as the following reaction equation 4. Yield (%) of $NF_3$ can be calculated by the following calculation equation 1 with reference to moles of $F_2$ supplied.

$$F_2+4/3NH_3 \rightarrow 1/3NF_3(\text{object})+NH_4F(\text{extra ammonium fluoride salt produced})$$ [reaction equation 4]

$$[NF_3\text{yield, \%}]=100\times[(\text{moles of }NF_3\text{produced})\times 3]/[\text{moles of }F_2\text{ supplied}]$$ [calculation equation 1]

SUMMARY OF THE INVENTION

Accordingly, the present invention has been made to solve the above-mentioned problems occurring in the prior art, and an object of the present invention is to provide a method for producing $NF_3$ by directly contacting gaseous fluorine with a fused ammonium fluoride salt, in which the fused ammonium fluoride salt and fluorine are efficiently contacted, thus preventing a phenomenon in which heat of reaction is excessively produced and accumulated in some regions, and increasing $NF_3$ yield thereof at a lower reaction temperature while facilitating proper control of the reaction temperature.

In order to accomplish this object, there is provided a method comprising the steps of: forming a jet stream having micro droplets of a fused ammonium fluoride salt by rapidly ejecting the fused ammonium fluoride salt into a reactor through a nozzle while circulating the fused ammonium fluoride salt in the reactor from a lower portion to an upper portion; and contacting micro droplets of the fused ammonium fluoride salt with fluorine gas sucked in the reactor through a suction pipe for fluorine gas by a negative pressure formed around the nozzle due to a rapid ejection of the fused ammonium fluoride salt.

The reactor used in the present invention for taking a reactant, a fused ammonium fluoride salt, from the lower portion thereof to the upper portion thereof, and ejecting the fused salt through nozzles thereof, thereby reacting the fused ammonium fluoride salt ejected as a jet-stream with the fluorine gas sucked in due to the negative pressure induced by the ejection of the fused salt, is called 'jet-loop reactor'.

According to the present invention, gaseous fluorine is sucked into a fast stream of a fused ammonium fluoride salt and reacted with the ammonium fluoride salt in the stream. Micro bubbles of fluorine and micro droplets of the fused salt contact each other in the stream, increasing contact efficiency of gas-liquid and producing a high yield of $NF_3$. Also, unreacted fluorine is dropped into the reactor together with the fused salt so that it is continuously reacted with ammonium fluoride salt while staying as micro bubbles in the fused ammonium fluoride salt. Since most of the reaction occurs inside the stream of the fused salt ejected and the stream of the fused salt is strongly introduced into the fused salt in the reactor then continuously circulated, the accumulation of the heat of reaction in a specific portion in the reactor is prevented.

Furthermore, the fluorine gas introduced into the reactor through a suction pipe for fluorine is diluted with a portion of $NF_3$-mixed gas by connecting the upper portion of the reactor for collecting the product, i.e., $NF_3$ with the suction pipe for fluorine using a tube so as to restrict a rapid reaction between ammonium fluoride and fluorine. That is to say, the method further restricts regional accumulation of heat of reaction and abrupt rising of reaction temperature, thus preventing a phenomenon in which lots of nitrogen is produced instead of $NF_3$ at high temperature. Herein, $NF_3$-mixed gas is such gas that exists in the upper portion of the reactor.

As shown in the reaction equation 2, the fused ammonium fluoride salt participates in the reaction in the state in which HF has been bound thereto, that is, in the type of $NH_4F.xHF$. With procedure of the reaction, the number of HF bound to $NH_4F$ is gradually increased.

Accordingly, if great amounts of HF is bound to the ammonium fluoride salt, it should be reacted with ammonia so as to be reproduced as shown in the reaction equation 3, thus constantly maintaining a proper ratio of $HF/NH_3$ in the fused ammonium fluoride salt.

In order to reproduce the fused ammonium fluoride salt having lots of HF bound thereto, a simple method is provided, in which, when the ratio of $HF/NH_3$ is increased, the supply of fluorine gas is isolated and ammonia gas is sucked into the reactor, thus contacting ammonia gas with the jet flow of fused ammonium fluoride salt ejected from the nozzles.

In order to reproduce the fused ammonium fluoride salt having lots of HF bound thereto, the other method is provided, in which the same jet-loop reactor as the above reactor is separately installed as a reproduction reactor. Herein, a portion of the fused ammonium fluoride salt in the reactor is transferred to the reproduction reactor and is rapidly ejected into the reproduction reactor through a nozzle while being circulated from lower portion to upper portion in the reproduction reactor, thereby contacting micro droplets of the fused ammonium fluoride salt in the fast stream with ammonia gas sucked in by negative pressure formed around the nozzle due to the ejection of the fused salt so as to reproduce the ammonium fluoride salt having a proper ratio of $HF/NH_3$ and then to carry it to the reactor. According to this method, $NF_3$ is continuously produced in the reactor while the fused ammonium fluoride salt is continuously regenerated in the reproduction reactor.

The fused ammonium fluoride salt is ejected into a jet ejector pipe having a structure as shown in FIG. 2. Preferably, a nozzle has a throat, which has a cross sectional area 5~25 times larger than that of nozzle holes.

In the nozzle, ejection velocity for the fused ammonium fluoride salt reaches 2~30 m/sec, preferably, 5~20 m/sec with reference to a linear velocity.

The fused ammonium fluoride salt and fluorine are reacted with each other at a temperature of 100~150° C., preferably 110~130° C., in the reactor, and the fused ammonium fluoride salt and ammonia are reacted with each other at a temperature of 90~120° C. in the reproduction reactor

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
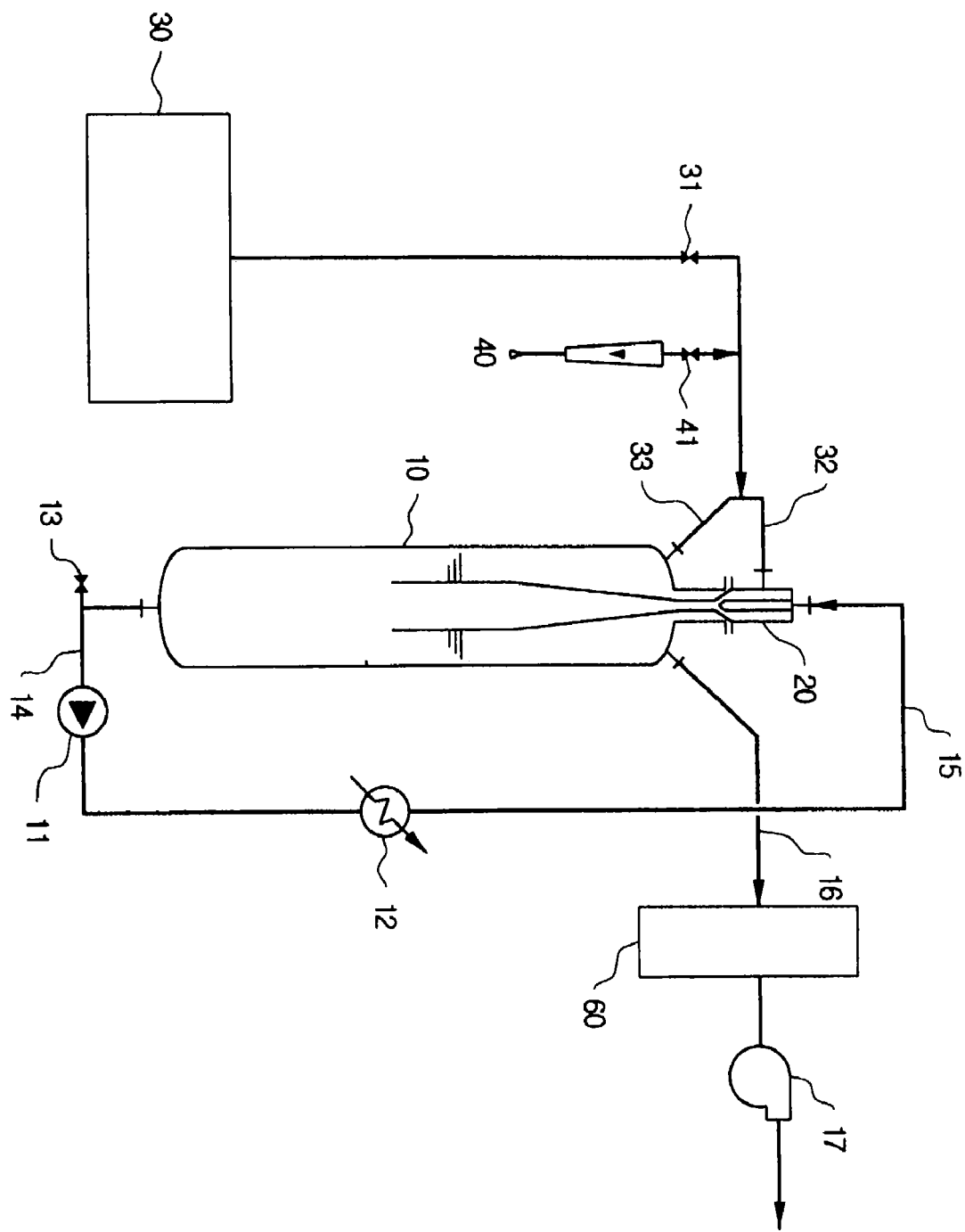
FIG. 1 is a view of an embodiment of an apparatus for producing $NF_3$, which has a jet-loop reactor.
Figure 2:
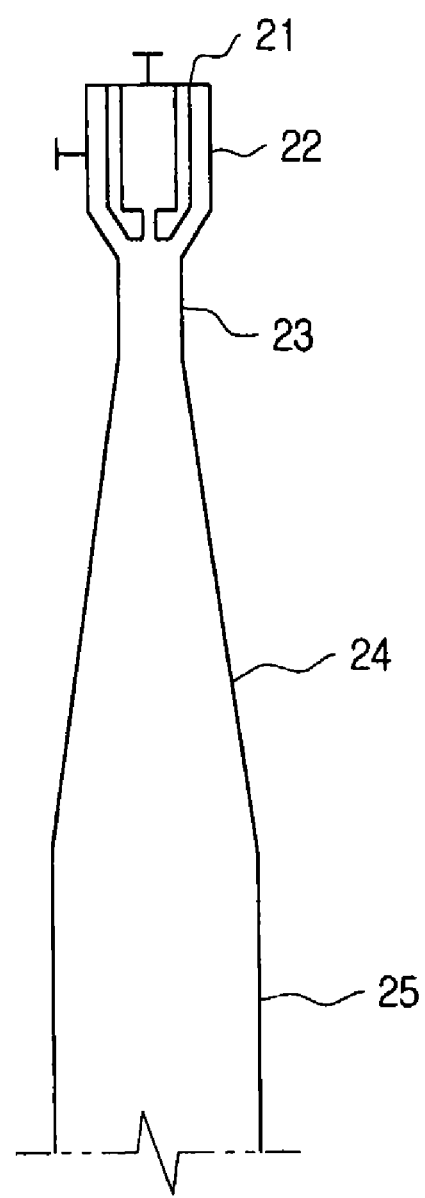
FIG. 2 is a detailed view of a jet ejector pipe adopted on the jet-loop reactor.
Figure 3:
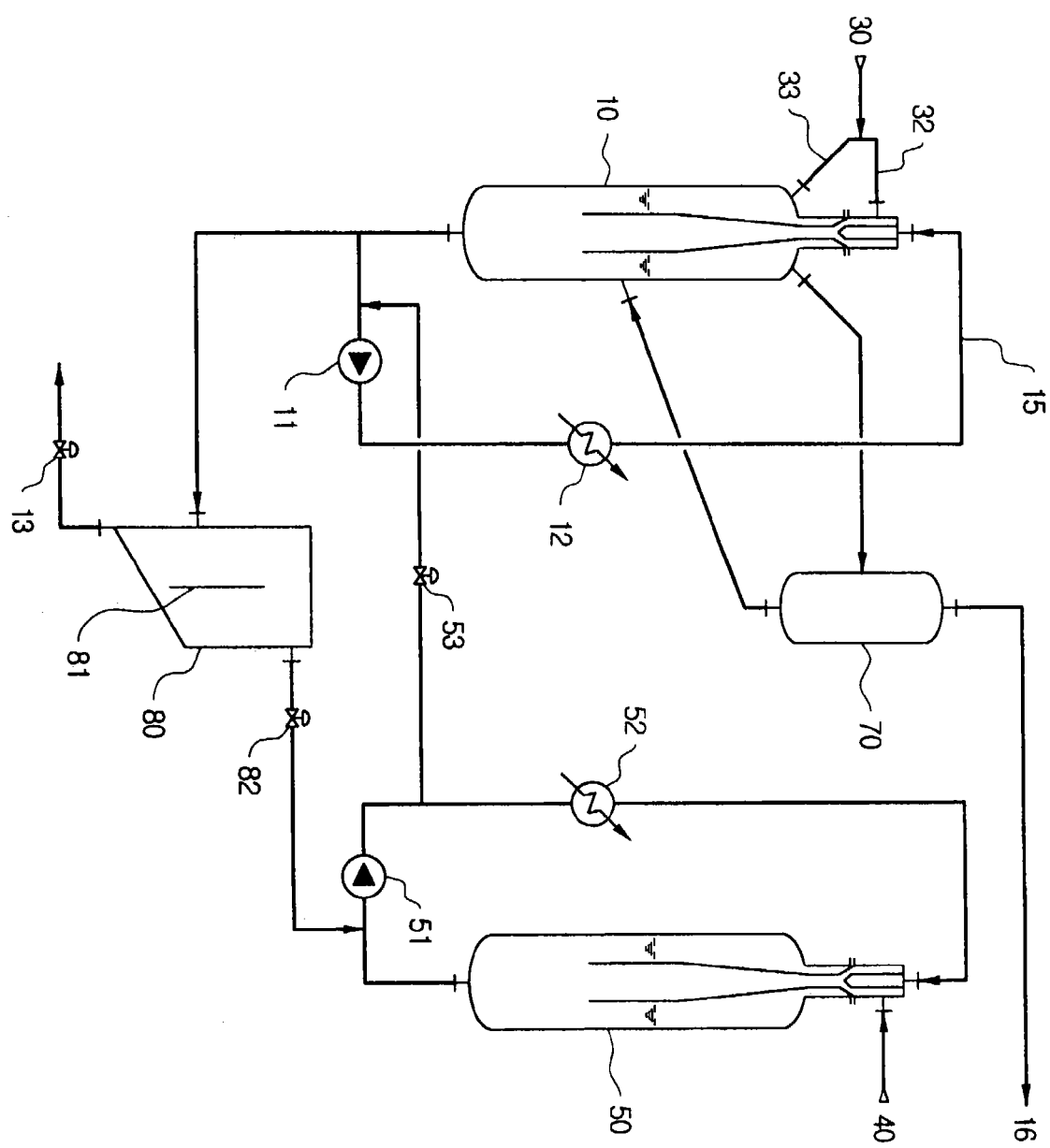
FIG. 3 is a view of an embodiment of an apparatus for producing $NF_3$, which has a separate reproduction reactor for a fused ammonium fluoride salt.

The construction of the present invention is now described in detail by chasing after a flow of reactant and product with reference to FIGS. 1 to 3.

FIG. 1 is a view of an embodiment of an apparatus for producing $NF_3$, which has a jet-loop reactor; FIG. 2 is a detailed view of a jet ejector pipe adopted on the jet-loop reactor; and FIG. 3 is a view of an embodiment of an apparatus for producing $NF_3$, which has a separate reproduction reactor for a fused ammonium fluoride salt.

The fused ammonium fluoride salt in a reactor 10 is circulated from a lower portion of the reactor through a cooler 12 and is ejected into the reactor through a nozzle 21 of a jet ejector pipe 20 on the upper portion of the reactor by the use of a circulation pump 11.

Fluorine is generated in an electrolyzer 30 for fluorine and is introduced into the jet ejector pipe 20 through a suction pipe 32 for fluorine due to negative pressure generated by a jet-flowing of a fused ammonium fluoride salt, thereby reacting with the fused ammonium fluoride salt in micro-droplet state.

Meanwhile, fluorine gas sucked into the suction pipe 32 for fluorine through a supply valve 31 for fluorine is mixed with the gas containing $NF_3$, nitrogen fluoride by-products $N_2F_2$ and $N_2F_4$, nitrogen, unreacted fluorine, etc. sucked from the upper portion of the reactor 10 through a gas circulating pipe 33 connected with the upper portion of the reactor, thereby reducing the concentration of fluorine. The reason for reduction of fluorine concentration is that a large amount of heat is generated in a production reaction (reaction equation 2) for $NF_3$ so that the amount of reactant fluorine should be properly controlled. Also, it is possible for supply valve 31 for fluorine to control the amount of fluorine supplied and therefore the amount of heat generated without adopting the gas circulating pipe 33 for dilution of fluorine.

The diluted fluorine gas mixed with $NF_3$ is introduced into the jet ejector pipe 20 due to a negative pressure (suction force) generated by a fast stream of a fused ammonium fluoride salt ejected as a high-speed jet flow. In the jet ejector pipe, the diluted fluorine gas is mostly reacted with micro droplets of the fused ammonium fluoride salt and is ejected into the fused ammonium fluoride salt in the reactor while passing through the throat 23, a diffuser 24 and an expansion tube 25.

The bubbles formed in the fused ammonium fluoride salt are so small that they remain in the fused salt for a long time while maintaining a large contact area between gas and liquid, thus accelerating the reaction while restricting the abrupt reaction with a large amount of $F_2$. Also, since micro bubbles are homogeneously dispersed in the fused ammonium fluoride salt, reaction is not concentrated to a specific region so that the heat generated from the reaction can be evenly dispersed, which allows a production of $NF_3$ at high conversion. The product gas with the major element of $NF_3$ is transferred towards a separating and refining process and a liquefaction process through a discharge pipe 16 and an acid-washing column 60 by means of a blowing fan 17.

When the reaction for producing $NF_3$ through reacting the fused ammonium fluoride salt with fluorine is conducted, the element of $NH_3$ in the ammonium fluoride salt is exhausted and HF is produced and bound to the ammonium fluoride salt, gradually increasing a ratio of $HF/NH_3$ of the fused ammonium fluoride salt as shown in the reaction equation 2. When the reaction for reproducing the fused ammonium fluoride salt of a high HF content through reacting the fused salt with ammonia is conducted, $NH_3$ is bound to the ammonium fluoride salt, gradually reducing the ratio of $HF/NH_3$ in the fused ammonium fluoride salt to a proper value and increasing the moles of ammonium fluoride as in the reaction equation 3. In the overall reaction, the amount of ammonium fluoride salt in the reactor is increased as shown in the net reaction equation of reaction equation 4.

Accordingly, reproduction of the fused ammonium fluoride salt needs to be carried out in such a manner that a portion of the fused ammonium fluoride salt with increased concentration of HF is periodically discharged through an exit valve 13 for fused ammonium fluoride salt, the supply valve 31 for $F_2$ is closed, and ammonia is supplied through a supply valve 41 for ammonia so as to react with the fused ammonium fluoride salt to fill up $NH_3$-element exhausted as a reactant, thus reproducing the fused ammonium fluoride salt with proper concentration of HF as much as a proper amount thereof.

A reaction of HF in a fused ammonium fluoride salt with ammonia (reaction equation 3) is also a considerable exothermic reaction and is rapidly conducted, so that, if ammonia is supplied to a stagnant or sluggish fused ammonium fluoride salt, the HF concentration of the fused salt around a suction portion 22 for ammonia or inside a expansion tube 25 where the fused ammonium fluoride salt and ammonia are in contact with each other is rapidly reduced, thus generating a phenomenon of blocking an inlet due to rising of a melting point of the salt at the same position.

Accordingly, as in a fluorination reaction (reaction equation 2), the fused ammonium fluoride salt in the reactor is forcedly circulated through the cooler 12 by the circulating pump 11 and is ejected at high speed through the nozzle 21 of the jet ejector pipe 20. Ammonia sucked through the suction pipe 32 for fluorine due to a suction force generated by a high-speed jet flow is mixed with ejecting micro droplets of the fused ammonium fluoride salt, and the mixed fused salt thereafter is ejected into the fused ammonium fluoride salt in the reactor through the throat 23, diffuser 24 and expansion tube 25. The ammoniating reaction of ammonium fluoride salt is mostly conducted in the stream of the fused salt ejected through the above steps and the unreacted ammonia is further reacted while staying as small bubbles in the fused ammonium fluoride salt in the reactor.

With the method like this, the fused ammonium fluoride salt is reproduced so that an abrupt ammoniating reaction of the ammonium fluoride salt and a regional accumulation of heat of reaction are restricted to control the reaction rate and to maintain an even concentration of HF in the fused salt.

As a method for effectively reproducing the fused ammonium fluoride salt, there is provided a method in which a separate reproduction reactor is installed as shown in FIG. 3.

Reactor 10 for producing $NF_3$ comprises a gas circulating pipe 33 for drawing a portion of mixed gas of $NF_3$ produced in the reactor and mixing the same with $F_2$ gas introduced as a reactant. Also, a reproduction reactor 50 for regenerating a fused ammonium fluoride salt has the same construction as the reactor 10 excluding that the reproduction reactor 50 has no gas circulating pipe and sucks pure ammonia gas 40 without a diluting gas.

When mixed $NF_3$ gas produced from the reactor 10 is discharged, a portion of the fused ammonium fluoride salt in the reactor 10 flows out in foamy state which is separated by a bubble remover 70 and transferred to the reactor 10, and the mixed $NF_3$ gas is discharged to an acid-washing column (not shown in the drawings). Such a bubble remover 70 can be installed between the reactor 10 and the acid-washing column 60 of the apparatus of FIG. 1.

In order to maintain the ratio of HF/$NH_3$ and the amount of the fused ammonium fluoride salt (i.e., in order to reproduce the fused ammonium fluoride salt), a portion of the fused salt is transferred to a sediment-separating bath 80 with a partition 81 installed therein as shown in FIG. 3. In the sediment-separating bath 80, a certain amount of the fused salt transferred from the reactor 10 is discharged at constant rate through the exit valve 13 in the lower portion of the bath (at this time, a fused salt residue bound with metallic corrosives and having increased boiling point and specific gravity is discharged at the same time), and the fused salt on the upper part of the bath is transferred to the reproduction reactor 50.

In the reproduction reactor 50, ammonia is supplied to the circulating fused ammonium fluoride salt by certain amounts corresponding to those exhausted for production of $NF_3$ and those in the fused ammonium fluoride salt discharged through an exit valve 82 of the sediment-separating bath 80. Ammonia supplied rapidly reacts with HF excessively bound to the fused ammonium fluoride salt while the fused salt is continuously circulated around the reproduction reactor. The fused ammonium fluoride salt reproduced is then transferred to the reactor 10 through a control valve 53 for carrying a proper amount of fused salt.

Hereinafter, the present invention is described in detail with reference to some embodiments of the present invention. The scope of the present invention, however, is not limited only to the embodiments described.

Embodiment 1

A. Apparatus

An experiment was conducted using an apparatus shown in FIG. 1. A reactor is a vertical tube type reactor having a diameter of 8 inch and a volume of 36 l, which has a jet ejector pipe installed thereon, in which a throat having seven nozzles are provided. Inner diameters of the throat and the nozzle are 15 mm and 1.8 mm, respectively, so that the ratio of the cross sectional area of the throat to the total cross sectional area of the nozzles in the jet enjector pipe is about 10.

B. Experiment (1) Production of a Fused Ammonium Fluoride Salt

25 Kg acidic ammonium fluoride salt ($NH_4F.HF$) was introduced into the reactor and gases in the reactor were drawn out. 8 Kg HF was slowly supplied and temperature was raised to 120° C., thus producing a fused ammonium fluoride salt. Then, Ar gas was introduced into the reactor up to ambient pressure and the fused ammonium fluoride salt was circulated through the jet ejector pipe so as to provide an even concentration of HF of the fused ammonium fluoride salt, by a gear pump capable of controlling the pumping speed.

Volume of the fused ammonium fluoride salt produced was about 25 l, and according to the titration of the salt using NaOH solution, the molar ratio of HF/$NH_3$ was 2.9 (that is, the value of x is 1.9 in $NH_4F.xHF$).

(2) Production of Fluorine

Fluorine was produced at a rate of 4.42 gmol (168 g) per hour by electrolysis of a fused KF.2HF salt at the electric current of 250A through a carbon electrode with effective area of 0.22 $m^2$. Herein, with the result of measuring an amount of hydrogen produced, the average current efficiency for producing fluorine was 95%.

(3) Production of Nitrogen Trifluoride

Nitrogen trifluoride was produced by circulating the fused ammonium fluoride salt at a flow rate of 13 l/min (the linear velocity of the fused salt at the nozzle equals about 12 m/sec) so as to contact the fused salt with $F_2$ sucked, for. 3 hours, while maintaining the temperature of the fused salt in the reactor at 120° C.

C. Results

Gas product exhausted from the reactor was sampled every hour and was passed through a bed of NaF pellets so that HF in the gaseous product was removed. Then, the HF-removed sample gas was passed through a bed of aluminum oxide ($Al_2O_3$) pellets so that the unreacted $F_2$ was removed. With the result of analysis, the average yield of $NF_3$ was 93.0% and the average conversion of $F_2$ was 97.9%. Also, a composition of the fused ammonium fluoride salt after the reaction was measured that the molar ratio of HF/$NF_3$ was 2.96.

Herein, the stirring force applied to the reactor equals that of kinetic energy of the fused ammonium fluoride salt, that is ejected from the nozzle, so that it can be calculated from the following calculation equation 2.

$$P = m \cdot U^2 / 2 \qquad \text{[calculation equation 2]}$$

Herein, P means a stirring force [W], m means a mass velocity of the circulating fused salt [kg/sec], and U means an ejection linear velocity of the fused salt at a nozzle [m/sec].

When quantity of the fused salt circulated, Q, equals 13 l/min, density of the fused salt, d, equals 1320 Kg/m$^3$, total cross sectional area of nozzles, a, equals 0.178 cm$^2$ (a=7·π·0.18$^2$/4), so that m=d·Q/6000=0.286 Kg/sec, U=Q/6a=12.17 m/sec, P=0.286×12.17$^2$/2=21.18 W, and volume of the fused salt equals 25 l, whereby a stirring force applied per unit volume of the fused ammonium fluoride salt equals 0.85 kW/m$^3$ (P=21.18/25).

As compared with U.S. Pat. No. 5,637,285 (entitled that reactor with a flat-blade turbine type stirrer), in which the stirring force applied per unit volume equals 4.5 kW/m$^3$ and the conversion of F$_2$ equals 63%, the stirring force per unit volume applied to the embodiment of the present invention does not exceed 20% of that of the US patent, but the conversion of F$_2$ equals about 1.5 times that of the US patent, which is about 35% point higher than that of the US patent.

Embodiments 2 to 6

The embodiments were conducted by the same apparatus and method as in the embodiment 1, except that a temperature range of the fused ammonium fluoride salt was changed to a range of 100~150° C. The yield of NF$_3$ and the conversion of F$_2$ for a respective temperature were shown in the following Table 1.

TABLE 1

| Embodiment | Reaction Temp. (° C.) | Conversion of F$_2$ (%) | Yield of NF$_3$ (%) |
|---|---|---|---|
| 2 | 100 | 76.2 ± 1.3 | 74.7 ± 1.7 |
| 3 | 110 | 96.5 ± 0.5 | 93.6 ± 0.3 |
| 1 | 120 | 97.9 ± 0.3 | 93.0 ± 0.2 |
| 4 | 130 | 98.6 ± 0.2 | 89.7 ± 0.2 |
| 5 | 140 | 99.1 ± 0.2 | 84.2 ± 0.2 |
| 6 | 150 | 99.4 ± 0.1 | 80.5 ± 0.3 |

The conversion of F$_2$ became higher along with the increase of temperature while the yield of NF$_3$ had a maximum value at 110~120° C. but was likely to be gradually reduced in the rest of the range. The production rate of NF$_3$ per hour also had a maximum value at 110~120° C., and the higher the reaction temperature was, the more amount of by-products, N$_2$F$_2$ and N$_2$, was produced.

At a reaction temperature of 110~120° C., the temperature of an acid-washing column for cleaning the exhaust gas was maintained at 20~25° C., But at a high reaction temperature (140° C., 150° C.), the temperature of the acid-washing column for cleaning the exhaust gas was also highly maintained (40~50° C.), which meant that more HF had been exhausted together with the product gas exhausting from the reactor when the temperature was higher.

Embodiments 7 to 12

The embodiments were conducted by the same apparatus and method as in the embodiments 1 to 6, except that a molar ratio of HF/NH$_3$ of the fused ammonium fluoride salt was set to 3.50~3.56. Yield of NF$_3$ and conversion of F$_2$ for a respective temperature at the given molar ratio of HF/NH$_3$ were shown in the following Table 2.

TABLE 2

| Embodiment | Reaction Temp.(° C.) | Conversion of F$_2$ (%) | Yield of NF$_3$ (%) |
|---|---|---|---|
| 7 | 100 | 60.3 ± 2.6 | 58.5 ± 3.7 |
| 8 | 110 | 78.9 ± 0.9 | 76.6 ± 0.8 |
| 9 | 120 | 83.2 ± 1.1 | 79.9 ± 0.7 |
| 10 | 130 | 85.4 ± 0.6 | 79.0 ± 0.5 |
| 11 | 140 | 88.9 ± 0.5 | 78.2 ± 0.4 |
| 12 | 150 | 90.4 ± 0.7 | 75.9 ± 0.5 |

Generally, if a concentration of HF of the fused ammonium fluoride salt was excessively high, both the yield of NF$_3$ and the conversion of F$_2$ were low as compared with the results of the embodiments 1 to 6. As for the conversion of F$_2$, the higher was the reaction temperature, the more was it likely to increase as in the embodiments 1 to 6, and as for the yield of NF$_3$, it had a maximum value at 120~130° C. but was likely to gradually reduce in the rest of the range. The production rate of NF$_3$ per hour had a maximum value at 130° C., and the higher was the reaction temperature, the more was the quantity of by-products, N$_2$F$_2$ and N$_2$, produced. Generally, a temperature of the acid-washing column for cleaning the exhaust gas was maintained at 45~55° C. which was higher than those of the embodiments 1 to 6. The higher the reaction temperature was, the higher the temperature in the acid-washing column was maintained. Acidity of the washing solution was also rapidly increased, which meant that more HF had been exhausted together with the exhausting product gas at a higher reaction temperature and a higher molar ratio of HF/NH$_3$ of the fused ammonium fluoride salt.

Embodiments 13 to 15

Reaction temperature was set to 120° C. and the molar ratio of HF/NF$_3$ in the fused ammonium fluoride salt was set to 2.90~2.96. A flow rate of the fused ammonium fluoride salt was changed between 7 and 16 l per hour by controlling the revolution speed of the gear pump. Yield of NF$_3$ and conversion of F$_2$ for a respective circulating speed were shown in the following Table 3.

TABLE 3

| Embodiment | Circulating Speed (L/min) | Ejection pressure (bar) | Conversion of F$_2$ (%) | Yield of NF$_3$ (%) |
|---|---|---|---|---|
| 13 | 7 | 0.8 | 77.2 ± 4.2 | 64.8 ± 6.7 |
| 14 | 10 | 1.7 | 88.6 ± 0.7 | 82.4 ± 0.5 |
| 1 | 13 | 2.8 | 97.9 ± 0.3 | 93.0 ± 0.2 |
| 15 | 16 | 4.0 | 98.2 ± 0.2 | 94.3 ± 0.2 |

The higher was the circulating speed of the fused ammonium fluoride salt, the higher were both the yield of NF$_3$ and the conversion of F$_2$. Herein, since if the circulating speed is increased, a suction force for F$_2$ is also increased, the amount of F$_2$ supplied was forcedly controlled by a F$_2$ transferring valve.

When the circulating speed of the fused ammonium fluoride salt was low, the amount of N$_2$ in the by-products was remarkably increased. When the circulating speed of the fused salt was high, the amount of NF$_3$ produced was increased. However, it had a problem in that foams of the fused salt were greatly generated above the surface of the fused salt so that the foams were discharged together with the exhaust gas.

Accordingly, in order to prevent a phenomenon of excessive discharge of the salt foams, the circulating speed of the fused ammonium fluoride salt should be controlled.

Embodiment 16

Apparatus

A. In order to constantly maintain a molar ratio of $HF/NF_3$ of a fused ammonium fluoride salt, an apparatus shown in FIG. 3 was used, in which another jet-loop reactor, i.e., a reproduction reactor of a fused ammonium fluoride salt, was installed beside the reactor for producing $NF_3$ used in embodiments 1 to 15.

B. Experiment

With the same method as in the embodiment 1, the fused ammonium fluoride salt of which the ratio of $HF/NH_3$ was 2.9 was filled in the reactor for $NF_3$ and the reproduction reactor. The fused ammonium fluoride salt was separately circulated at 13 l/min in respective reactors so as to maintain each concentration of HF constant. A portion of the fused ammonium fluoride salt with a constant HF concentration in the reactor for $NF_3$ was supplied to the insulated sediment-separating bath to completely fill it with the same. With the same method as described above, the same amount of the fused ammonium fluoride salt as that supplied to the sediment-separating bath was again produced to fill the reactor for $NF_3$.

Successively, electric current of 250A was supplied to the fluorine generator to produce $F_2$ gas, which was sucked by a negative pressure around the jet ejector and was supplied to the reactor for $NF_3$ so as to react with a fused ammonium fluoride salt. $NF_3$ mixed gas produced from the reaction was discharged to the acid-washing column. Once the $NF_3$ mixed gas was stably produced and discharged, the fused ammonium fluoride salts in respective reactors were transferred to each other by serially opening valves 7 and 10, and ammonia gas started to be sucked to the reproduction reactor. Herein, at the lower part of the sediment-separating bath, the fused salt was discharged at 105~110 g/hour, and in the reproduction reactor, ammonia gas was supplied at 0.95~1.05 l/min.

Temperatures of the $NF_3$ reactor and the reproduction reactor were maintained at 120° C. and 100° C., respectively, using the coolers 11 and 12. There was provided a temperature controlling effect that the temperature of each reactor could be constantly maintained by operating the cooler 12 solely without operating the other cooler 11 on condition that the flow rates between two reactors were properly controlled through the valves 7 and 10.

C. Results

With the results of the reaction for 2 days, the conversion of $F_2$ could be maintained at a range of 98~99% and the yield of $NF_3$ could be also maintained at a range of 91~94%.

Figure 4:
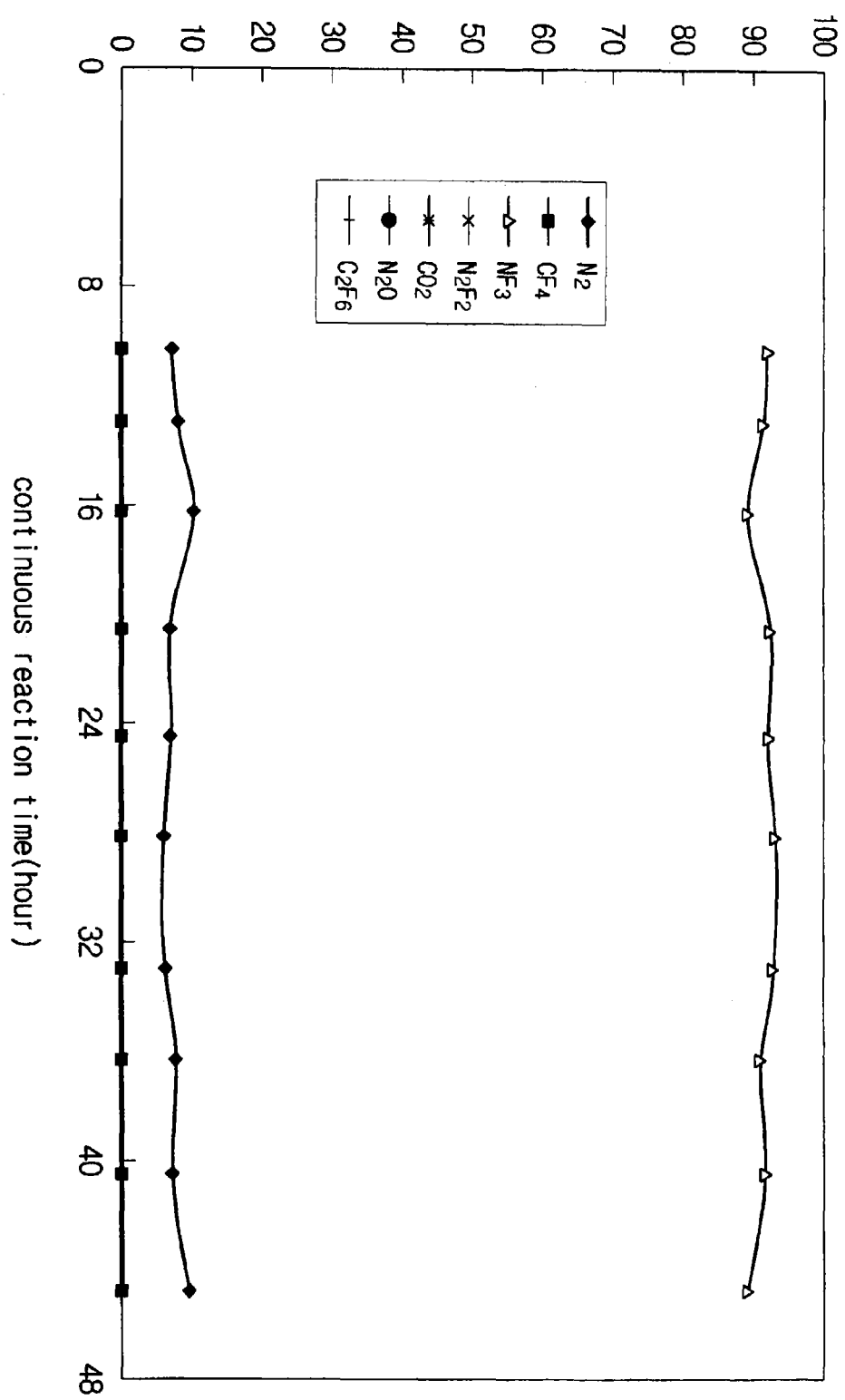
FIG. 4 is a graph of composition of mixed gas relative to the reaction time on stream, the mixed gas being produced in the reactor for $NF_3$ during the continuous operation of the apparatus of FIG. 3.

A composition change of the $NF_3$ mixed gas produced by the 2-day continuous reaction was provided in FIG. 4.

It has been known that by-products except $N_2$ were produced by only small quantities, that the quantity of $NF_3$ production was also maintained at a constant range, and that the production rate and the yield of $NF_3$ were stably maintained high without a considerable change by carrying out the production reaction for $NF_3$ and the reproduction reaction for the fused ammonium fluoride salt side by side.

According to the present invention, following effects are provided.

First, a portion of $NF_3$ produced is naturally mixed with $F_2$ gas to dilute $F_2$ and the mixed gas is reacted with a circulating fused ammonium fluoride salt without using any inert gas such as $N_2$, He, Ar, etc. to dilute $F_2$ or any special gas circulator, so that excessive generation and regional accumulation of the heat of reaction are prevented, whereby reaction temperature can be lowered by 10~30° C. compared with those of the existing methods, and a side reaction is hardly occurred according to the reduction of reaction temperature, thus increasing the selectivity of the reaction for $NF_3$.

Second, comparing with U.S. Pat. No. 5,637,285, even though the energy of 1.0 $kW/m^3$ or less, which corresponds to only 20% of the energy required in the patent, is used, the yield of $NF_3$ can be increased to 80~94%.

Third, if fluorine gas is supplied into a fused ammonium fluoride salt by bubbling through a sparger, $F_2$ gas has to be pressurized far higher than the hydraulic head above the supplying point. However, in the present invention, fluorine gas is supplied by a suction force which is generated by a jet flow of the fused salt so that the fluorine gas produced in an electrolyzer for fluorine can be used as it is.

Fourth, the fused ammonium fluoride salt after use in the reaction can be reproduced rapidly and stably by supplying ammonia gas to the fused ammonium fluoride salt using the same method as above. When a separate reproduction reactor is installed (FIG. 3), $NF_3$ can be produced at a constant speed in the reactor for $NF_3$, while removing extra fused ammonium fluoride salt produced and simultaneously reproducing the fused ammonium fluoride salt in the reproduction reactor.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for producing nitrogen trifluoride by contacting a fused ammonium fluoride salt with a fluorine gas comprising:

forming a stream of micro droplets of the fused ammonium fluoride salt by a rapid ejection of the fused ammonium fluoride salt in a reactor through a jet ejector pipe having nozzles, each of said nozzles having a nozzle cross-sectional area and a throat having a throat cross sectional area, wherein said throat cross sectional area to said nozzle cross sectional area is, a ratio selected from the group consisting of 5, 25, 5 through 25, and any combinations thereof, and wherein said fused ammonium fluoride salt at said nozzles has an ejecting linear velocity of about 2 meters/second to about 30 meters/second;

circulating the fused ammonium fluoride salt from a lower portion to an upper portion of said reactor;

contacting within said stream of micro droplets the fused ammonium fluoride salt with the fluorine gas, the fluorine gas being sucked in said reactor through a suction pipe for fluorine gas by a negative pressure, said negative pressure being formed around said nozzle due to said rapid ejection of the fused ammonium fluoride salt; and transferring a portion of the fused ammonium fluoride salt in said reactor to a second jet-loop reactor, said portion being rapidly ejected in said second jet-loop reactor through a second nozzle, said portion being circulated from a lower portion to an upper portion of said second jet-loop reactor, a stream of micro droplets of said portion being contacted with ammonia gas, said ammonia gas being sucked in said second jet-loop reactor by a negative pressure being formed around said second nozzle due to an ejection of the fused ammonium fluoride salt, wherein said portion and said ammonia gas continuously produce nitrogen trifluoride, continuously reproduce the fused ammonium fluoride salt and recycle the fused ammonium fluoride salt reproduced in said second jet-loop reactor for nitrogen trifluoride production.

2. The method for producing nitrogen trifluoride according to claim 1, further comprising the step of:

periodically or intermittently isolating the fluorine gas and sucking an ammonia gas in said reactor to reproduce the fused ammonium fluoride salt through a contact of the ammonia gas with said stream, wherein a ratio of $HF/NH_3$ is maintained at a constant level.

3. The method for producing nitrogen trifluoride according to claim 1, wherein the fluorine gas is introduced into said reactor through said suction pipe, the fluorine gas being diluted with mixed gases, said mixed gases having $NF_3$ in said reactor, the fluorine gas being introduced in said reactor by connecting said upper portion with said suction pipe using a tube.

4. The method for producing nitrogen trifluoride according to claim 1, wherein an ejecting linear velocity of the fused ammonium fluoride salt at said nozzle is about 5 meters/second through about 20 meters/second.

5. The method for producing nitrogen trifluoride according to claim 1, wherein the fused ammonium fluoride salt and the fluorine gas are contacted with each other at a temperature of about 100 degrees Celsius through about 150 degrees Celsius.

6. The method for producing nitrogen trifluoride according to claim 1, wherein the fused ammonium fluoride salt and the fluorine gas are contacted with each other at a temperature of about 110 degrees Celsius through about 130 degrees Celsius.

7. The method for producing nitrogen trifluoride according to claim 2, wherein the fused ammonium fluoride salt and the ammonia gas are contacted with each other at a temperature of about 70 degrees Celsius through about 150 degrees Celsius.

8. The method for producing nitrogen trifluoride according to claim 1, wherein the fused ammonium fluoride salt and the ammonia gas are contacted with each other at a temperature of about 70 degrees Celsius through about 150 degrees Celsius.

9. The method for producing nitrogen trifluoride according to claim 2, wherein the fused ammonium fluoride salt and the ammonia gas are contacted with each other at a temperature of about 90 degrees Celsius through about 120 degrees Celsius.

10. The method for producing nitrogen trifluoride according to claim 1, wherein the fused ammonium fluoride salt and the ammonia gas are contacted with each other at a temperature of about 90 degrees Celsius through about 120 degrees Celsius.

* * * * *